US009276759B2

(12) United States Patent
Kaminsky et al.

(10) Patent No.: US 9,276,759 B2
(45) Date of Patent: Mar. 1, 2016

(54) MONITORING OF COMPUTER NETWORK RESOURCES HAVING SERVICE LEVEL OBJECTIVES

(75) Inventors: David Louis Kaminsky, Chapel Hill, NC (US); John Michael Lake, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 877 days.

(21) Appl. No.: 11/845,750

(22) Filed: Aug. 27, 2007

(65) Prior Publication Data

US 2009/0063672 A1 Mar. 5, 2009

(51) Int. Cl.
G06F 15/173 (2006.01)
H04L 12/26 (2006.01)
H04L 12/24 (2006.01)
H04L 12/28 (2006.01)

(52) U.S. Cl.
CPC ............ *H04L 12/2602* (2013.01); *H04L 41/12* (2013.01); *H04L 43/00* (2013.01); *H04L 12/2807* (2013.01)

(58) Field of Classification Search
USPC ................................................. 709/220–222
See application file for complete search history.

(56) References Cited

U.S. PATENT DOCUMENTS

| 6,718,384 | B2 * | 4/2004 | Linzy ............................. 709/224 |
| 2004/0117477 | A1 * | 6/2004 | Kaminsky et al. ............. 709/224 |
| 2004/0243699 | A1 | 12/2004 | Koclanes et al. |
| 2005/0102675 | A1 * | 5/2005 | Parkyn ........................... 718/102 |
| 2006/0064481 | A1 | 3/2006 | Baron et al. |
| 2006/0235650 | A1 | 10/2006 | Vinberg et al. |
| 2007/0192150 | A1 | 8/2007 | Belkin et al. |
| 2007/0234365 | A1 * | 10/2007 | Savit .............................. 718/104 |

FOREIGN PATENT DOCUMENTS

| JP | 2007184701 A | 7/2007 |
| WO | 2009027286 A1 | 3/2009 |

OTHER PUBLICATIONS

India Appln. 1525/CHENP/2010, Examination Report, Oct. 9, 2015, 2 pg.
WIPO Appln. PCT/EP2008060888, International Preliminary Report on Patentability, 6 pg. Mar. 2, 2010.

* cited by examiner

*Primary Examiner* — Thai Nguyen
(74) *Attorney, Agent, or Firm* — Cuenot, Forsythe & Kim, LLC

(57) ABSTRACT

In a typical computer network, at least some of the managed resources are monitored to determine whether those resources are meeting predetermined performance goals or service level objectives. To simplify the process of configuring a network monitor, information about the service level objectives is loaded into the resource itself. When the resource is detected, the service level objective information is extracted from the resource information and made available to a translating engine. The translating engine converts the extracted information to monitoring directions that are used to configure the network monitor. Embodiments in which new resources are detected either buying a registration process or a polling process are described.

6 Claims, 4 Drawing Sheets

MONITORING OF COMPUTER NETWORK RESOURCES HAVING SERVICE LEVEL OBJECTIVES

BACKGROUND OF THE INVENTION

The present invention relates to computer networks and more particularly to the real time monitoring of network resources that have performance goals (service level objectives).

The term "network resource" is a term that should be interpreted broadly enough to cover almost any hardware or software included in a computer network. The term includes, but is not limited to, special-purpose hardware devices such as switches, routers, hubs, content servers, network storage devices, etc., including the control programs for such hardware devices. The term also includes application programs that execute on either special-purpose or general purpose hardware components.

Some network resources are expected to meet certain performance goals or service level objectives during their operation. A simple example of a service level objective is that queries received from preferred customers must be responded to within two seconds. Typically, the performance of managed network resources is tracked by a network monitor, itself another network resource to whom events occurring at a managed network resource are reported. The network monitor is aware of the performance goals of the managed network resource and applies rules to the reported events in order to determine whether the service level objectives of the managed resource are being met.

A network monitor is, of course, expected to monitor more than a single network resource. Dozens or even hundreds of network resources may be monitored by a single network monitor. To keep track of the network resources that it manages, a network monitor makes use of a configuration management database (CMDB), a repository that stores authorized configurations of the managed network resources and the relationships among such resources. The network monitor may work directly with a configuration management database or indirectly with the database through a higher level network manager that works with multiple network monitors.

When a new network resource is added to a computer network, the network manager usually learns of the presence of the new resource in one of two ways. In one type of system, commonly called a registration system, the new resource advertises its own presence by broadcasting one or more registration request messages. When a registration request message is received at a network manager, the manager takes the steps necessary to see that the new resource is added to a list of managed resources and is associated with a particular network monitor. In another type of system, commonly called a polling system, a network manager periodically sends out polling messages that request information from devices receiving the polling messages. A new device responds to a polling message by making its presence known to the network manager.

While the presence of new resources in a computer network may be automatically detected, the process of configuring those new resources is still largely a manual process performed by system administrators. Information about the resources, including any service level objectives, is obtained independently of the registration or polling process, and used to establish the configuration recorded in the configuration management database.

SUMMARY OF THE INVENTION

The invention may be embodied as a method for monitoring a data processing resource that is new to a computer network. After the presence of the new resource is detected, operating goal policies provided by the resource are received. Resource monitoring policies are derived from the received resource goal policies. The new resource is monitored in accordance with the derived resource monitoring policies.

The invention may also be embodied as a computer program product for monitoring a new resource in a computer network. The computer program product includes a computer usable medium having computer usable program code. The program code is configured to detect the presence of the newly added resource, to receive operating goal policies from the resource and to derive resource monitoring policies from the received operating goal policies. The program code is also configured to monitor the new resource in accordance with the derived monitoring policies.

The invention may also be embodied as a computer network monitoring system for monitoring network resources, including a new resource. The monitoring system includes a resource detector subsystem that detects the presence of a new resource and a receiving subsystem that receives operating goal policies from the new resource. A translation engine derives resource monitoring policies from the received operating goal policies. A monitoring subsystem then monitors the new resource using the derived resource monitoring policies.

DETAILED DESCRIPTION OF THE INVENTION

Figure 1:
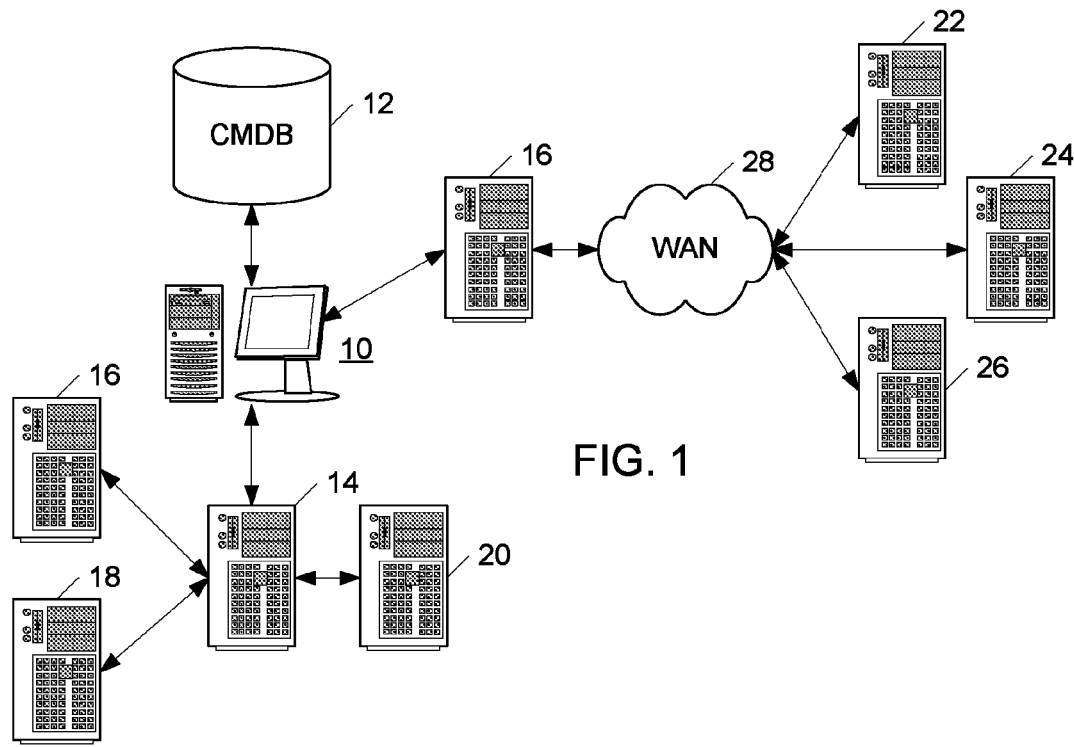
FIG. 1 is a pictorial representation of a computer network showing a network manager, network monitors and managed devices.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is an overview of a simple computer network shown as managed by a single network management system or network manager 10. The network manager 10 is linked to a CMDB or configuration management database 12 that stores configuration information about each of the resources in the computer network. The network resources include network monitors 14 and 16 that have the task of monitoring the performance of other resources in the computer network. Network monitor 14 is shown as having directly-connected managed resources 16, 18, 20. Network monitor 16 is shown as being connected to a set of managed resources 22, 24, 26 through a wide area network (WAN) 28.

The network representation is simplified for ease of illustration. In reality, a computer network would have more network monitors and each monitor would be responsible for many more managed resources. Also, while the drawing shows the network monitors as separate hardware devices, the network monitors may actually be computer program applications that run in the same or different hardware devices as the network manager. Furthermore, while each of the managed resources 16, 18, 20, 22, 24 and 26 is represented as a hardware device, the resource may actually be a computer application program running on a general-purpose computer device.

Figure 2:
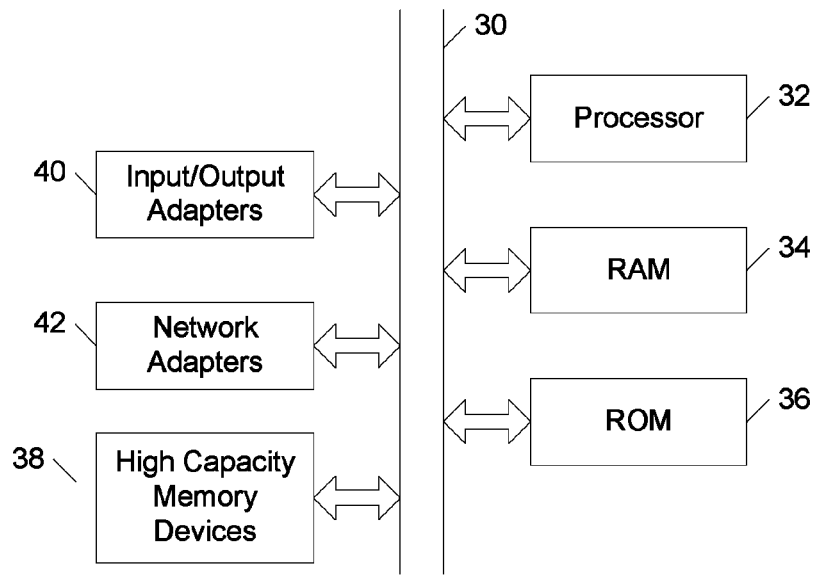
FIG. 2 is a block diagram of the hardware infrastructure for many of the devices illustrated in FIG. 1.

FIG. 2 is a block diagram of a hardware infrastructure that could be used for almost all of the devices previously mentioned. The infrastructure includes a system bus 30 that carries information and data among a plurality of hardware subsystems including a processor 32 used to execute program instructions received from a computer applications running on the hardware. The infrastructure also includes random access memory (RAM) 34 that provides temporary storage for program instructions and data during execution of a computer application and read-only memory (ROM) 36 often used to store program instructions required for proper operation of the device itself, as opposed to execution of computer applications. Long-term storage of programs and data is provided by high-capacity memory devices 38, such as magnetic hard drives or optical CD or DVD drives.

In a typical computer system, a considerable number of input/output devices are connected to the system bus 30 through input/output adapters 40. Commonly-used input/output devices include monitors, keyboards, pointing devices and printers. Increasingly, high-capacity memory devices are being connected to the system through what might be described as general purpose input/output adapters, such as USB or FireWire adapters. Finally, the computer system includes one or more network adapters 42 that are used to connect the system to other computer systems through intervening computer networks of the type previously mentioned.

Referring momentarily back to FIG. 1, the network monitors 14 and 16 generally monitor the performance of the managed resources. At least some of the managed resources may have service level objectives, performance goals that are expected to be met during system operation. For example, if a managed resource is a customer support application, a performance goal for that application may be that any queries from a preferred class of customers will receive a response within x seconds of receiving the query.

The network monitor associated with the customer support application must be configured to detect a query from a preferred customer and the response to that query from the customer support application. In known systems, the information required to configure the network monitor was made available to a system installer or system administrator who then used the provided information to create monitoring policies for use by the network monitor.

Figure 3:
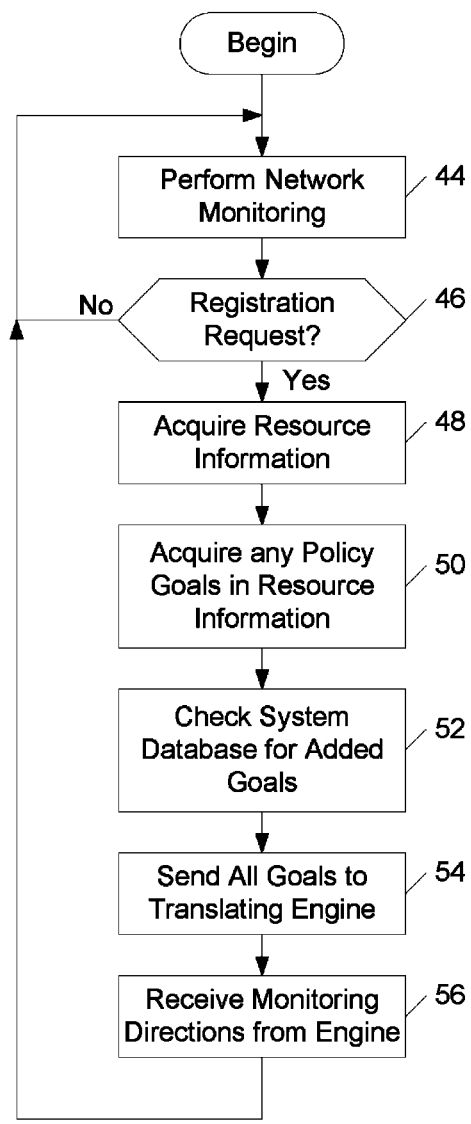
FIG. 3 is a flow chart of operations that are performed in establishing monitoring policies for a new resource in a registration-type system.

FIG. 3 is a flow chart of a process for automating the creation of monitoring policies required to determine whether a new managed resource is meeting predetermined performance goals. It is assumed that the network monitor is already monitoring other managed devices in an operation 44 and will continue to do so until a registration request is received from a new resource in an operation 46. When the registration request is received, the request itself may include information about the requesting resource or the network monitor may query the resource to provide the resource information. Both types of operations fall within the scope of step 48. A determination 50 is then made whether the resource information received directly from the new resource includes any policy goals of the type discussed earlier. Whether the resource information itself includes policy goals, the network monitor checks the system database, the configuration management database, in step 52 to determine whether the configuration management database already contains performance goals for the type of resource being added to the computer network. Policy goals can also be stored outside the resource, for example, in a database, and associated with the resource. Such associations can be made using standard linking techniques (such as URLs or URIs), or can be implicit based on tags. In one example of the latter case, a tag such as "Linux" can be applied both to a server resource and a policy, and the association of that policy with the resource is made through the common tag. The mechanism of associating policies has no impact on the translation of policy goals by the translation engine.

All performance goals, whether received from the new resource or from the configuration management database based on the type of the new resource, are sent to a translating engine in step 54. The function of a translating engine is to convert the goals into the events that are to be reported to the network monitor and into rules for processing the reported events. The events and the rules can be characterized as monitoring directions that are provided to the network monitor by the translating engine in a step 56.

Once the network monitor is configured with monitoring directions for the new resource, the system returns to performing normal network monitoring operation, including monitoring of the new resource to determine whether it is meeting predetermined performance goals.

Figure 4:
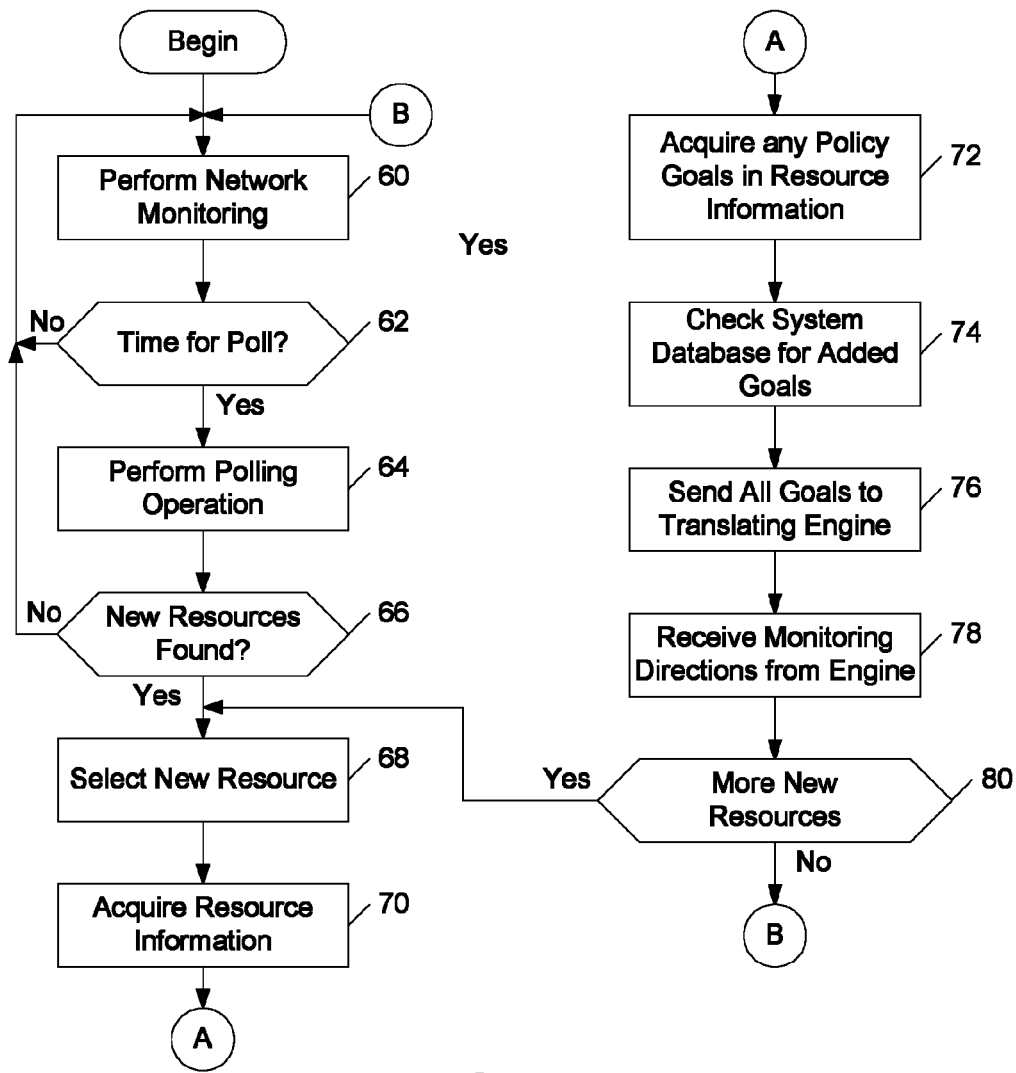
FIG. 4 is a flow chart of operations that are performed in establishing monitoring policies for a new resource in a polling-type system.

The description above is of the type of computer network in which new resources make their presence known by registering with the network monitor. FIG. 4 is a flow chart of operations that will occur in adding new resources with performance goals to another known type of computer system, a system in which a polling process is used to detect newly-added resources. Again, it is assumed that the network monitor is already performing network monitoring (operation 60). As part of the normal network monitoring, the network monitor periodically polls or queries the network to determine whether any resources have been added to the network. Until an operation 62 indicates that it is time for another poll, normal network monitoring operations 60 continue. At the appropriate time, the network is polled (operation 64) to identify newly added resources. If no new resources are detected in an operation 66, normal network monitoring 60 is resumed until it is time for the next poll.

Assuming new resources are found in the poll, one of the new resources is selected in step 68 and information is acquired from that resource in step 70. Any policy goals contained in the resource information are required in step 72. The system database is interrogated in step 74 to determine whether it includes any additional policy goals for the selected resource type. All goals are sent to the translating engine in step 76 where they are converted to monitoring directions for the network monitor. The monitoring directions are provided to the network monitor in step 78 and the check 80 is made as to whether the poll revealed additional new resources. If there are additional new resources to be processed, the program loop beginning at operation 68 and ending an operation 80 is repeated for each new resource. Once all of the new resources have been processed in the network monitor has been configured to monitor those resources, normal network monitoring resumes at operation 60.

In one implementation of the present invention, the previously described processes could be performed by a program executing in a programmable, general purpose computer system. Alternatively, the invention may be implemented in a dedicated or special-purpose computer system in which some or all of the operations are performed using hardwired logic or firmware.

Figure 5:
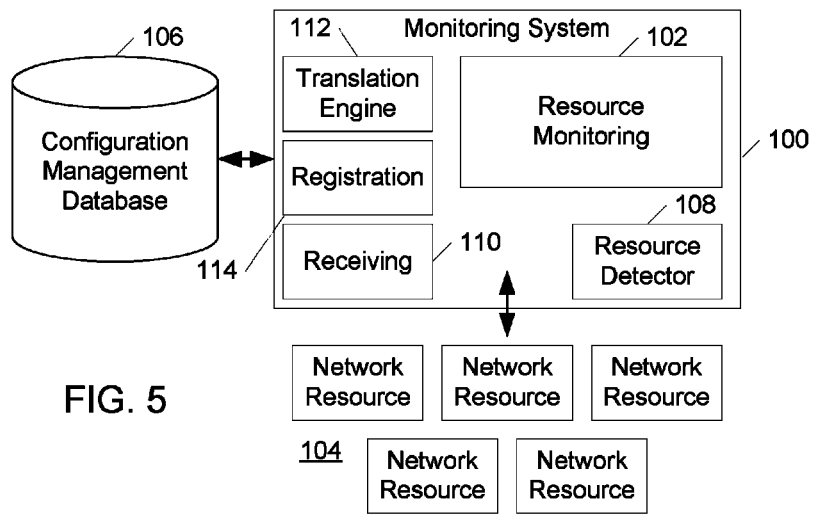
FIG. 5 is a block diagram of a special-purpose device for implementing the invention in a registration-type system.

FIG. 5 is a block diagram of a special-purpose monitoring system 100 that could be used in implementing the invention in a registration-type system. The system 100 includes a number of subsystems including a resource monitoring subsystem 102 that monitors the performance of a number of network resources 104, normally using information provided by a configuration management database 106 containing information about all of the managed network resources. The monitoring system 100 includes a resource detector subsystem 108 which receives information about newly added network resources. Once the newly added resource is detected, information about the resource is provided through a receiving subsystem 110. Resource information received directly from a new resource through receiving subsystem 110 or indirectly from the configuration management database 106 based on the resource type is processed by translation engine 112 to derive monitoring directions for the newly added resource. A registration subsystem 114 oversees the process of deriving monitoring directions and completes registration of the newly added resource.

Figure 6:
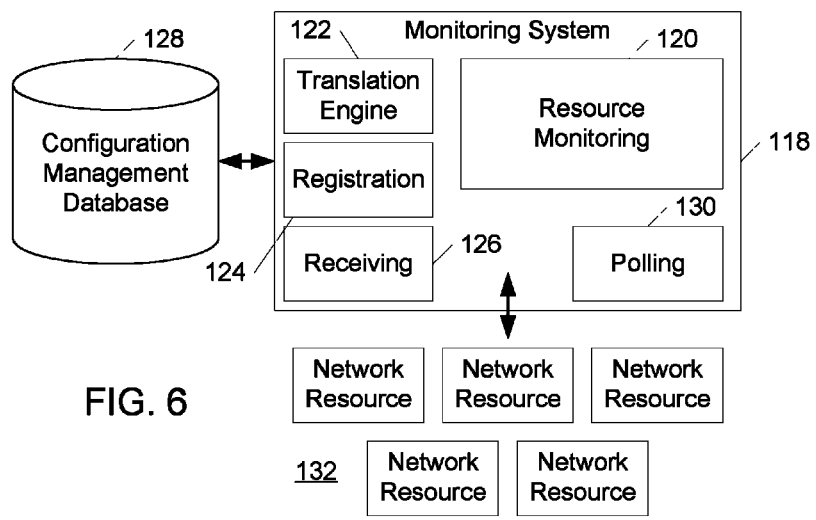
FIG. 6 is a block diagram of a special-purpose device for implementing the invention in a polling-type system.

FIG. 6 is a block diagram of another special purpose monitoring system 118 that could be used to implement the invention in the type of network in which new resources are discovered by a polling process. The system 120 includes a resource monitoring subsystem 120, a translation engine 122, a registration subsystem 124 and a receiving subsystem 126. Each of these components performs the functions already described with reference to corresponding subsystems in FIG. 5. The system 120 also works with a configuration management database 128 that performs functions already described. The system 120 includes a polling subsystem 130 that periodically polls the entire set of network resources 132 for any newly added resources.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for monitoring a data processing resource that is newly added to a computer network, comprising:
    detecting, within the computer network, a presence of the newly added resource;
    receiving, from the newly added resource, a performance goal;
    translating the performance goal into a monitoring policy including at least one event to be reported to a network monitor, and at least one rule for processing the at least one event; and
    monitoring, using the monitoring policy, the newly added resource;
    identifying, from a source separate from the newly added resource, an additional performance goal associated with a type of the newly added resource, wherein
    the translating uses the performance goal received from the newly added resource and the additional performance goal; and
    wherein the detecting the presence includes:
    receiving a registration request from the newly added resource; and establishing
    a monitoring relationship with the newly added resource.

2. The method of claim 1, wherein
    the detecting the presence includes:
        discovering the newly added resource during a poll of network resources; and
        establishing a monitoring relationship with the newly added resource.

3. A computer hardware system for monitoring a data processing resource that is newly added to a computer network, comprising:
    at least one hardware processor, wherein the at least one hardware processor is configured perform:
    detecting, within the computer network, a presence of the newly added resource;
    receiving, from the newly added resource, a performance goal;
    translating the performance goal into a monitoring policy including at least one event to be reported to a network monitor, and at least one rule for processing the at least one event; and
    monitoring, using the monitoring policy, the newly added resource;
    identifying, from a source separate from the newly added resource, an additional performance goal associated with a type of the newly added resource, wherein
    the translating uses the performance goal received from the newly added resource and the additional performance goal; and
    wherein the detecting the presence includes:
    receiving a registration request from the newly added resource; and establishing a monitoring relationship with the newly added resource.

4. The system of claim 3, wherein
    the detecting the presence includes:
        discovering the newly added resource during a poll of network resources; and
        establishing a monitoring relationship with the newly added resource.

5. A computer program product, comprising
    a computer readable storage device having stored therein computer usable instructions for monitoring a data processing resource that is newly added to a computer network,
    the computer usable instructions, which when executed by a computer hardware system, cause the computer hardware system to perform:
    detecting, within the computer network, a presence of the newly added resource;
    receiving, from the newly added resource, a performance goal;
    translating the performance goal into a monitoring policy including at least one event to be reported to a network monitor, and at least one rule for processing the at least one event; and
    monitoring, using the monitoring policy, the newly added resource, wherein the computer readable storage device does not consist of a transitory, propagating signal;
    identifying, from a source separate from the newly added resource, an additional performance goal associated with a type of the newly added resource, wherein
    the translating uses the performance goal received from the newly added resource and the additional performance goal; and
    wherein the detecting the presence includes:
    receiving a registration request from the newly added resource; and establishing a monitoring relationship with the newly added resource.

6. The computer program product of claim 5, wherein
    the detecting the presence includes:
        discovering the newly added resource during a poll of network resources; and establishing a monitoring relationship with the newly added resource.

* * * * *